(12) United States Patent
Van Kesteren

(10) Patent No.: US 6,873,576 B1
(45) Date of Patent: Mar. 29, 2005

(54) METHOD OF THERMALLY-ASSISTED DATA RECORDING AND A RECORDING APPARATUS

(75) Inventor: Hans Willem Van Kesteren, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 949 days.

(21) Appl. No.: 09/614,156

(22) Filed: Jul. 11, 2000

(30) Foreign Application Priority Data

May 24, 2000 (EP) .............................. 00201843

(51) Int. Cl.$^7$ ............................... G11B 11/00
(52) U.S. Cl. .................... 369/13.17; 369/13.32
(58) Field of Search ................ 369/13.17, 13.14, 369/13.32, 13.24, 13.22, 13.35, 13.12, 283, 288, 44.16, 44.17, 110.01, 13.47; 360/317, 125

(56) References Cited

U.S. PATENT DOCUMENTS

| 5,452,272 A | * | 9/1995 | Murakami et al. ........ 369/13.32 |
| 5,726,964 A | * | 3/1998 | Van Kesteren et al. . 369/110.01 |
| 5,952,094 A | * | 9/1999 | Van Kesteren et al. ..... 428/332 |
| 6,016,290 A | * | 1/2000 | Chen et al. .............. 369/13.17 |

FOREIGN PATENT DOCUMENTS

JP          61278060          12/1986

OTHER PUBLICATIONS

H. Katayama et al., "New Magnetic Recording Method Using Laser Assisted Read/Write Technologies", Proceedings of Magneto–Optical Recording International Symposium '99, J. Magn. Soc. Japan vol. 23, Supplement No. S1 1999, pp. 233–236.

H. Nemoto et al., "Exchange–Coupled Magnetic Bilayer Media for Thermomagnetic Writing and Flux Detection", Japan J. Appl. Phts. vol. 38, 1999, pp. 1841–1842, part 1, No. 3B.

"High Density Magnetic Storage Using an Atomic Force Microscope with Optical Detection", IBM Technical Disclosure Bulletin, US, IBM Corp., New York, vol. 34, No. 7B, Dec. 1991, pp. 365–367, XP000282610.

* cited by examiner

Primary Examiner—Ali Neyzari
(74) Attorney, Agent, or Firm—Michael E. Belk

(57) ABSTRACT

A method for thermally-assisted magnetic recording at an areal density above 100 Gb/in2 combines thermo-magnetic writing and optical or magnetic reading. In order to increase the stability of the recorded information, writing is carried out at an elevated temperature on a medium with a very high coercivity at room temperature. The magnetic write head determines the track width, allowing very small track widths, and the coercivity gradient resulting from the thermal gradient at the edge of the focused radiation spot, determines the bit length. The radiation may be varied so that the coercivity gradient at the trailing edge of the magnetic field is highest, when the magnetic field is switched.

16 Claims, 6 Drawing Sheets

Figure 1:
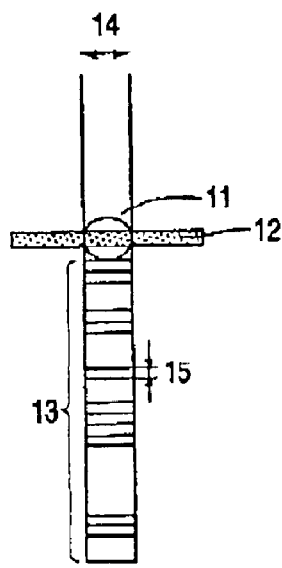

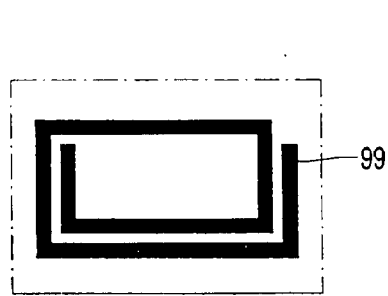
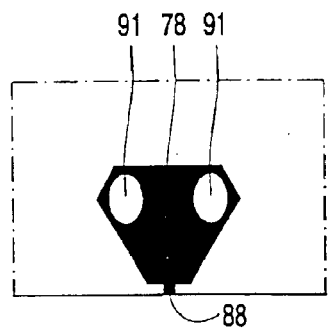
FIG. 9A  FIG. 9B
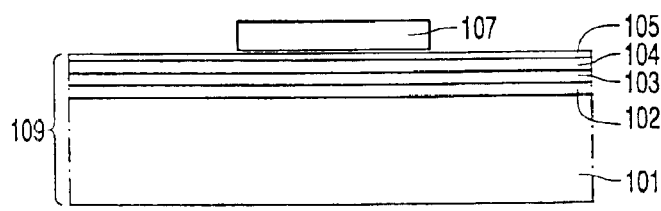
FIG. 10
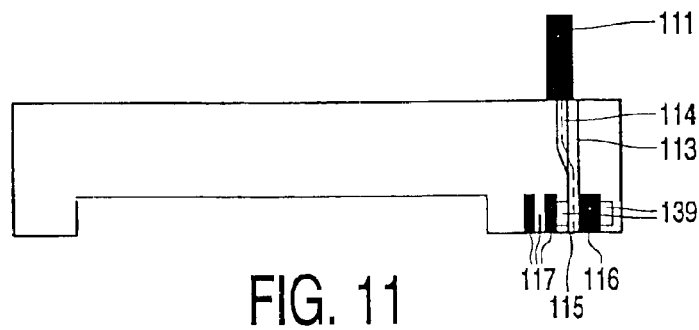
FIG. 11
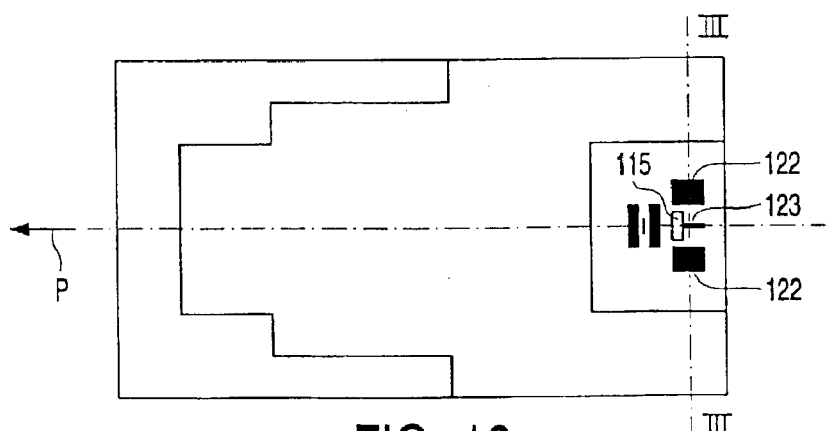
FIG. 12

METHOD OF THERMALLY-ASSISTED DATA RECORDING AND A RECORDING APPARATUS

The invention relates to a method of recording data in the form of bits in tracks on a magnetic medium, the recorded tracks having a trackwidth and the recorded bits in the track having a bitlength, using thermally assisted recording comprising recording data at an elevated temperature on the medium using a magnetic write head for generating a magnetic field and an optical head for the local heating of the medium by light from the optical head during recording for the temporary reduction of the coercivity of the medium to facilitate recording. The invention also relates to a recording apparatus for recording data in the form of bits along at least one track on a magnetic recording medium, the track having a track direction, the apparatus including a magnetic write head for generating a magnetic field having a profile at a recording location, an optical head for generating a light spot at the recording location for inducing a thermal profile in the medium, and an actuator for moving the recording location relative to the medium in the track direction.

In the near future conventional magnetic recording, using only a magnetic field to record data, will be hampered in its growth to higher densities and data rates. In conventional magnetic recording on granular media superparamagnetism will finally limit the stable and low-medium-noise recording of information to about 50–100 Gb/in$^2$ (1 Gb/in$^2$=1 Giga bit per square inch=1.6 bit/$\mu$m$^2$). It is generally believed that this areal density limit will be reached within a few years from now, because the present areal density in the most advanced products is already near 10 Gb/in$^2$ and the present annual growth rate is over 60%. A 'bit' is an area in a track having a magnetisation direction and representing data.

An increase in areal density is in principle possible when using thermally-assisted recording, in which the writing is carried out at an elevated temperature on a medium with a relatively high coercivity at room temperature, giving the recorded data a relatively good stability. The high stability at room temperature allows a higher areal density than possible with the conventional magnetic recording. The local heating of the medium during writing reduces the coercivity of the medium temporarily to a value that makes recording possible. An example of thermally-assisted recording is the conventional magneto-optical recording method. This method records data in a magnetic medium by heating the medium by means of a light spot at a location where the medium is subjected to a magnetic field having a relatively large extent, both in the track direction and perpendicular to it. The recorded data is read optically using the magneto-optical Kerr effect. The bit size obtained with magneto-optical recording is limited by the resolution of the optical system that forms the spot and the read data rate is limited by the Kerr rotation and the allowable laser power during reading. 'Light' means radiation that can be transmitted by an optical system. In general, the light will be generated by a laser.

Another form of thermally-assisted recording is the so-called hybrid recording. The method also uses a magnetic field and a light spot to write data, as described, for example, in reference [1] (references are listed at the end of the description). In the disclosed method the magnetic field has a rectangular cross-section with the longest dimension perpendicular to the track. The shortest dimension of the cross-section determines the bitlength, which is the length of a bit in the track direction. The size of the round light spot determines the trackwidth, which is equal to the width of a bit. The recorded data is read by means of a magnetic read head.

The object of the present invention is to provide a method for thermally-assisted recording and a recording apparatus having an improved areal density.

This object is achieved if the recording method according to the invention is characterized in that the said trackwidth is defined by the profile of the magnetic field and the said bitlength is defined by the thermal profile induced in the magnetic medium by the light. Since the profile of the magnetic field can be made small in comparison with the width of a light spot, the trackwidth and, hence, the period of the tracks can be reduced, allowing an increase of the areal density. The method is applicable to both hybrid and magneto-optical recording.

Preferably an embodiment of the invention is used which is characterized in that the laser light is pulsed. The sharpness of a bit transition in this recording-method is determined by the temperature gradient. The sharpness of the bit transitions can be increased by using laser-pulsed magnetic-field-modulation (LP-MFM), which leads to larger temperature gradients in the medium. For LP-MFM the modulation of the magnetic field according to the data stream to be recorded is combined with a fixed frequency pulsing of the laser light. The pulsing of the light is synchronized with the magnetic field modulation in such a way that sharp temperature gradients occur during the switching of the magnetic field. By using very short laser pulses and media that are thermally optimized for this laser pulsed writing method, large temperature gradients can be obtained. An advantage of using short pulses in the hybrid recording scheme proposed is that the thermal stability of the bits will be further increased because e.g. bits adjacent to the bit recorded will be exposed to an increased temperature for a shorter time. Another advantage of the hybrid recording method according to the invention is that the head-field gradient is no longer relevant for writing, which allows to use non-conventional head designs. These head designs can be more attractive for sub-micron trackwidth recording because they lead to e.g. a better trackwidth definition.

The recording method according to the invention allows a much smaller magnetic field profile than in conventional magneto-optical recording. Hence, magnetic write heads can be used that generate a higher-field, preferably higher than 30 kA/m. By using these higher write fields, the power in the light spot can de reduced and the writing will be executed at a lower temperature where the coercive field $H_c$ is higher. The lower write power further increases the thermal stability of the bits.

An embodiment of the invention is characterized in that reading of the data is performed by detecting the magnetic stray-field variations of the medium using a magneto-resistive (MR) sensor while a further embodiment of the invention is characterized in that reading of the data is performed using the magneto-optical (MO) effect of the medium by means of an optical sensor.

A recording apparatus according to the invention is characterized in that the profile of the magnetic field defines the width of a recorded bit in a direction perpendicular to the track direction and the thermal profile defines a length of a recorded bit in the track direction.

In a preferred embodiment of the apparatus, the magnetic head and the optical head are arranged on the same side of the magnetic medium. A recording apparatus of this kind has the advantage that the structure of the device may be simplified in that all mechanical components of the recording means can be disposed on a single side of the magnetic recording medium.

An embodiment of the magnetic recording data storage system according to the invention is characterized in that the magnetic recording medium is a magnetic disc medium and in that the apparatus includes an integrated flying slider having a medium-facing surface disposed on a first side of the slider, the said slider including at least one magnetic head provided with a first pole defining a width of the track, the first pole facing the medium-facing side of the slider, the slider also having an optical head including an exit window in the medium-facing surface and arranged to project a light beam out of the exit window to form a light spot on the magnetic recording medium, the exit window neighbouring the pole in the track direction.

The use of a magnetic head slider is well known in the art of magnetic recording on rigid magnetic discs or hard-disk drives which are used extensively in connection with computers. During operation the slider is supported on a thin air film gap which is created by aerodynamic effects acting between the spinning rigid disc medium and the medium facing side of the slider. This air film gap may have a thickness of less than 100 nanometer (nm), also called the flying height of the slider.

A practical embodiment of the invention is characterized in that that the magnetic head includes at least one return pole, the return pole and the first pole being oriented in a direction perpendicular to the track direction.

A further practical embodiment is characterized in that the magneto-resistive read head is a thin film read head of the shielded type, comprising a substrate and having shields having a width direction which is disposed perpendicular to the longitudinal direction of the head slider as viewed in the direction of relative movement of the head slider in respect of the magnetic disc medium.

An embodiment of the apparatus adapted for magneto-optical recording is characterized in that the optical head comprise focussing means for focussing a light beam to the light spot on the magnetic recording medium.

Special embodiments of the apparatus are characterized in that the optical head comprises adjusting means arranged for adjusting the position of the light spot relative to the pole of the magnetic recording head or in that the adjusting means comprise a mirror and mirror support means, the mirror being at least temporarily movable relative to the mirror support means for adjusting purposes.

The invention also relates to a head slider for a recording apparatus as defined heretofore.

Inductive yoke-type write heads have been made for trackwidths in the range of 200 –50 nm. These heads are essentially conventional hard disc write heads of which the poles at the Air Bearing Surface are structured to sub-micron dimensions by Focussed Ion Beam Etching. In comparison with [1] and also [2], trackwidth definition by the magnetic head offers the advantage that higher densities can be reached than by optical means. The width of an optical spot is determined by the wavelength of the light and the Numerical Aperture of the focussing optics. On the basis of a 400 nm laser and a near-field solid immersion lens technology it is very difficult to reduce the trackwidth to below approximately 150 nm.

Although MR readout will probably offer a higher SNR than MO readout, the latter might be preferred for systems with removable media because the required flying height of a slider necessary for a certain storage density in a MO system is expected to be higher than for a MR system at a similar storage density. The bit sizes recorded in this way are below the optical spot size. This means that during MO readout a MSR or domain expansion method is required. Preferably, the crossed magnetic and optical field profiles should be used during readout as well to determine the resolution. Although this has not been demonstrated it seems feasible that several of the known MSR and domain expansion methods can be applied or modified for this scheme.

With magnetic recording according to the present invention, a smaller transition width and higher density or a better signal-to-noise ratio can be obtained than those achievable by conventional magnetic recording and smaller trackwidths can be obtained than in conventional magneto-optical recording. In our invention, the trackwidth is not determined by optical limits but by the sub-micron width of the magnetic head, in contrast to the hybrid recording scheme proposed in [1].

Figure 2:
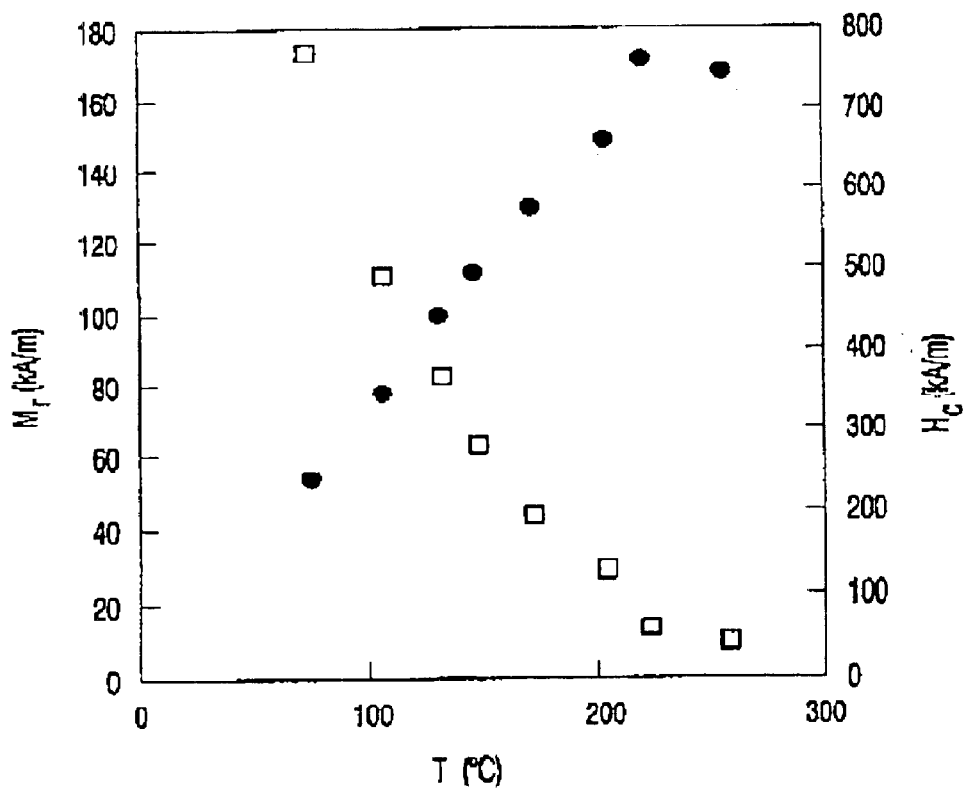
Figure 3:
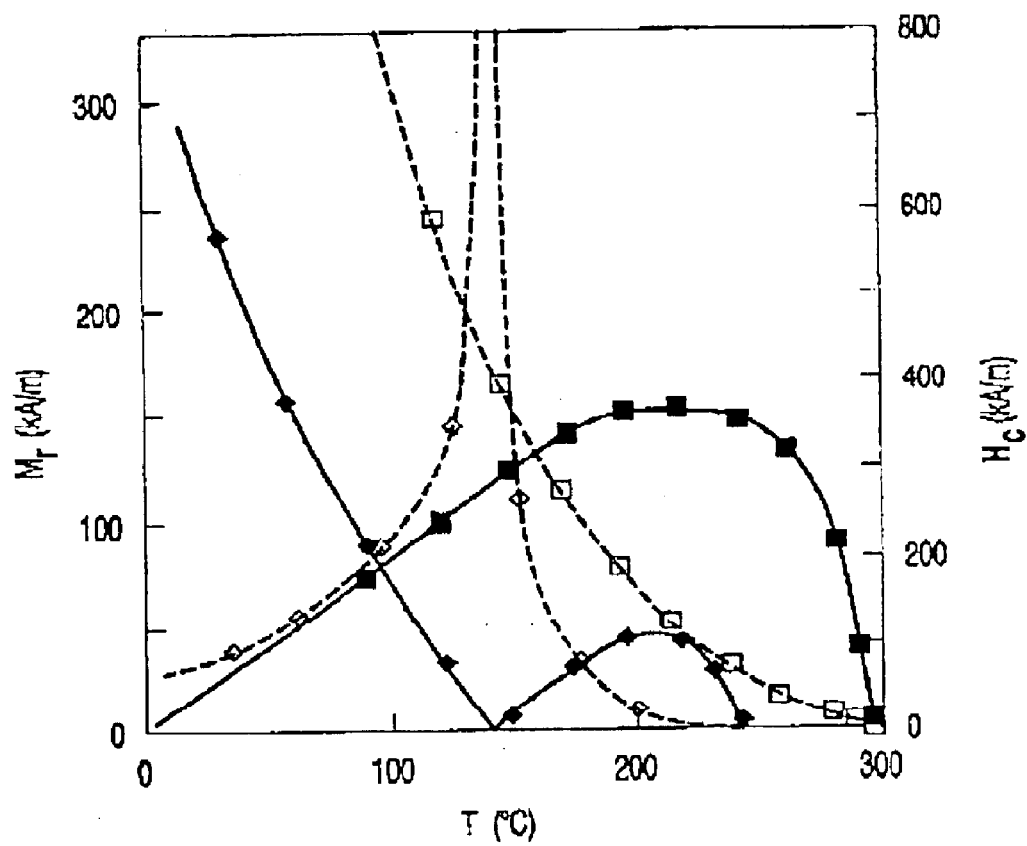
Figure 4:
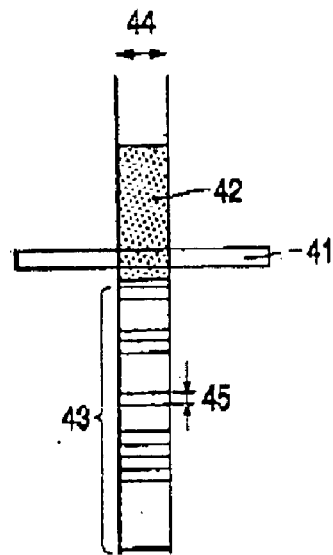
Figure 5:
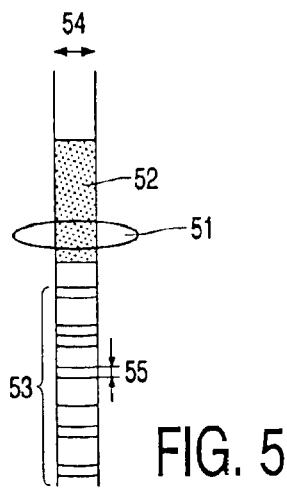
Figure 6:
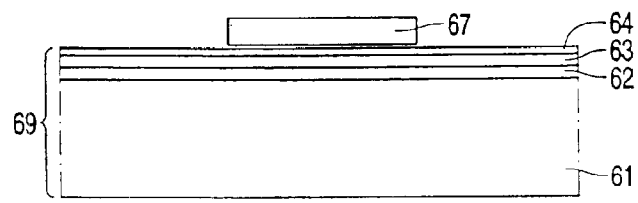
Figure 7:
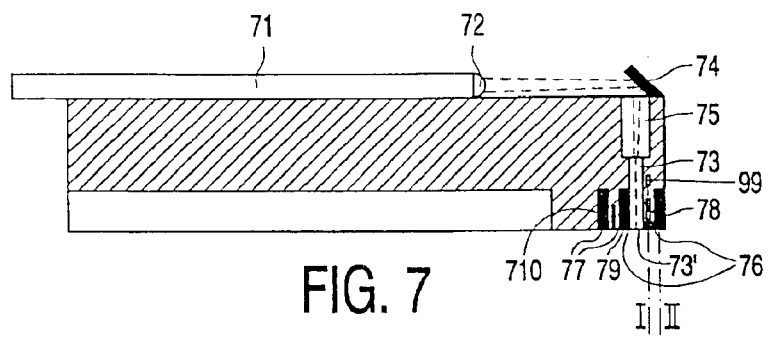
Figure 8:
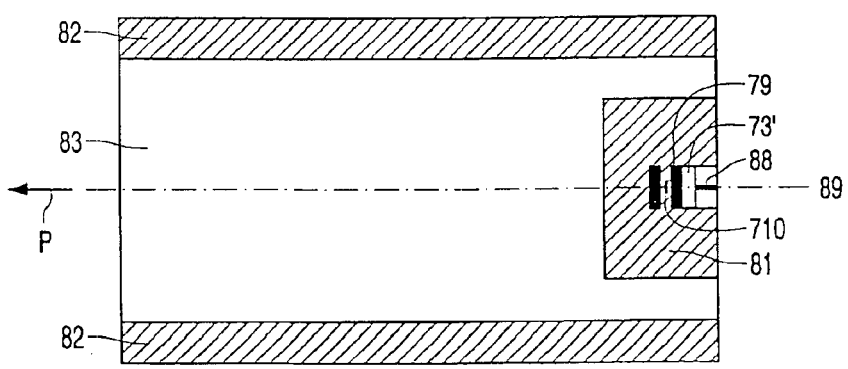
Figure 13:
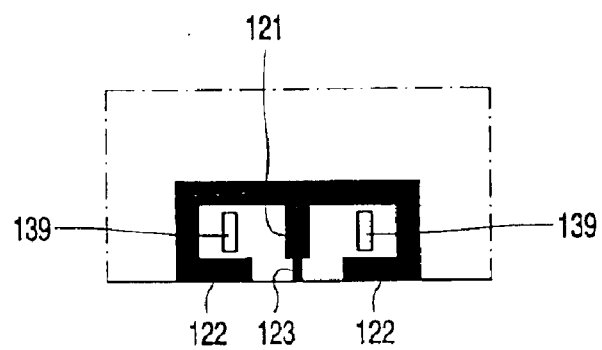
Figure 14:
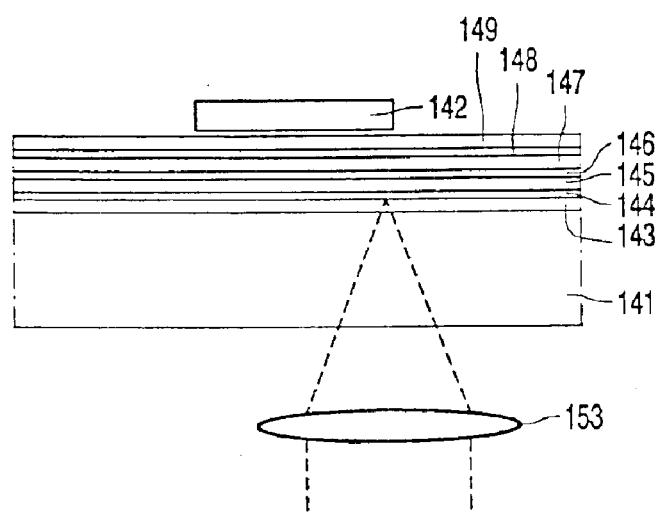
Figure 15:
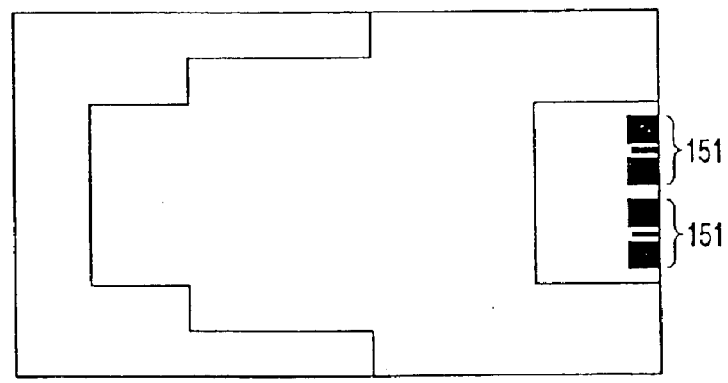
Figure 16:
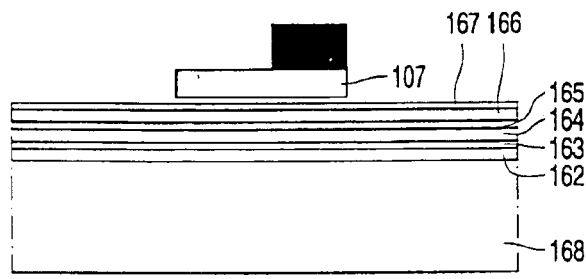
Figure 17:
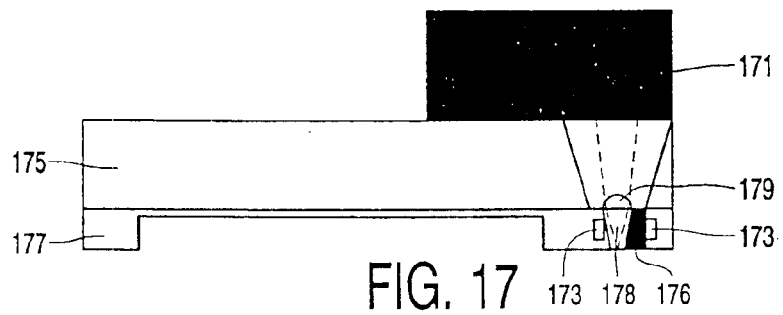
Figure 18:
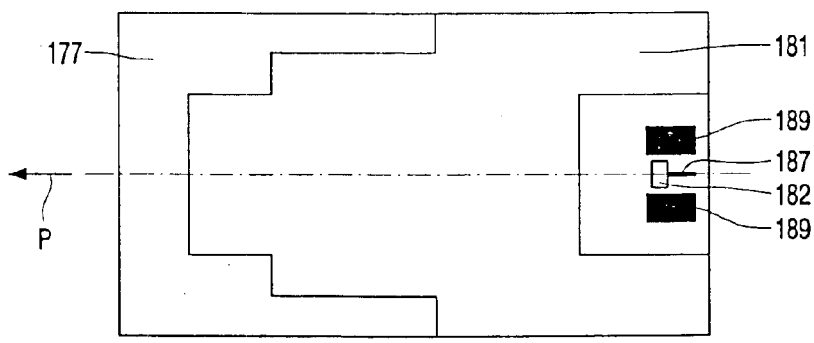
Figure 19:
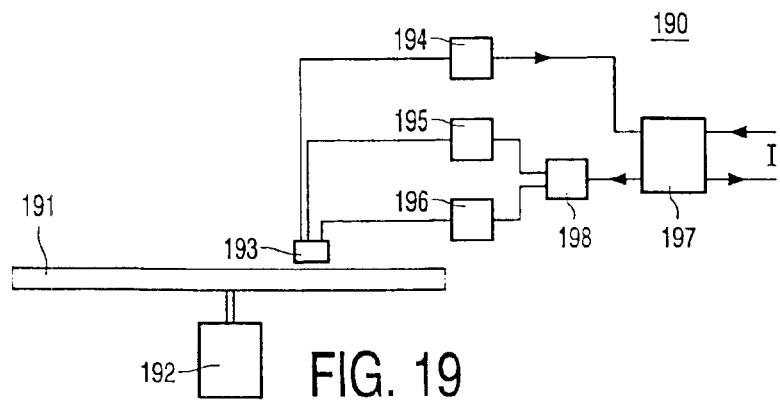

The invention will now be explained more fully with reference to the drawings, some of which relate to embodiments of the invention given by way of non-limiting examples only, the drawings showing in:

FIG. 1 a schematic representation of a prior art thermally-assisted writing method, FIG. 2 temperature dependence of Mr (dots) and Hc (squares) of a single-layer RE-TM medium for the prior-art hybrid recording method shown in FIG. 1, FIG. 3 temperature dependence of $M_r$, (solid lines) and $H_c$ (dotted lines) of a double-layer RE-TM medium for thermally-assisted recording with MR readout (squares: memory layer; diamonds: read-out layer), FIG. 4 a schematic representation of the hybrid recording method according to the invention where a line spot is used for heating the medium, FIG. 5 a schematic representation of the hybrid recording method according to the invention where an elliptical spot is used for heating the medium, FIG. 6 a schematic side view of a recording medium and slider suitable for thermally-assisted recording with MR read-out, FIG. 7 a schematic cross section of the slider shown in FIG. 6, FIG. 8 a bottom view of the slider of FIGS. 6 and 7, FIGS. 9A and 9B two cross sections of the magnetic write head of the slider of FIGS. 6–8, FIG. 10 a schematic side view of a recording medium and slider suitable for hybrid recording with MR read-out, FIG. 11 a schematic cross section of the slider shown in FIG. 10, FIG. 12 a bottom view of the slider of FIGS. 10 and 11, FIG. 13 a cross section of the magnetic write head of the slider of FIGS. 10–12, FIG. 14 a schematic side view of a recording medium and slider suitable for hybrid recording with MO read-out where the laser is focussed through the substrate, FIG. 15 a schematic cross section of the slider shown in FIG. 14, FIG. 16 a schematic side view of a recording medium and slider suitable for hybrid recording with MO read-out where the laser focussing optics is part of the slider with the magnetic recording head, FIG. 17 a schematic cross section of the slider shown in FIG. 16, FIG. 18 a bottom view of the slider of FIGS. 16 and 17, and FIG. 19 a schematic view of a recording apparatus according to the invention.

The thermally-assisted writing method described by Katayama et al [1] is schematically shown in FIG. 1. The diameter of the circular area 11 heated by the focussed laser spot determines the trackwidth 14 while the bit-transitions and thereby the bitlengths 15 are determined by the magnetic head-field area 12. Bit areas 13 having alternatively up and down magnetisation directions can be written on the medium by moving the medium under the recording location, i.e. the intersection of areas 11 and 12, by modulating the magnetic field according to the data and continuous irradiation by light. A suitable class of magnetic media that can be used in hybrid recording includes a recording layer of a rare-earth transition-metal (RE-TM) alloy. Perpendicular RE-TM media have been developed in the past for thermally-assisted writing in MO recording. The temperature dependence of the magnetic properties of a single-layer RE-TM medium optimized by [1] for the thermally-assisted writing scheme according to FIG. 1 is shown in FIG. 2. The compensation temperature of the rare-earth transition-metal (RE-TM) alloy chosen, $Tb_{23}Fe_{22}Co_{55}$, is around room temperature. The absence of demagnetizing fields due to the compensation of the magnetisation of the RE sublattice by that of the TM sublattice and the high coercive field at room temperature guarantee a good bit stability and large storage times. A fast reduction of coercive field $H_c$, for temperatures towards the writing temperature allows thermally-assisted writing with the magnetic fields that can be generated by thin-film write heads.

The RE-TM layers of conventional magneto-optical (MO) media have been optimized for magneto-optical (Kerr-effect) read-out. Thermally-assisted recording with magnetic readout using a magneto-resistive (MR) sensor as in hybrid recording requires optimization of the magnetisation at the read-out temperature. FIG. 3 shows the magnetic properties of a double-layer RE-TM medium adapted by Nemoto et al [2] to thermally-assisted magnetic recording and MR-read out at room temperature. The magnetisation of almost 300 kA/m (300 emu/cm3) of a read-out layer of the medium at room temperature is convenient for magnetic read out. The relatively very low coercivity of the TbDy-FeCo read-out layer itself at room temperature is compensated by exchange coupling to a TbFeCo memory layer of the medium having very high coercivity at room temperature.

Reference will now be made to embodiments of a hybrid recording system according to the present invention shown in FIGS. 4–18.

The combination of trackwidth definition by a magnetic head (field profile) and bitlength definition by an optical spot (thermal profile) has been considered up to now neither for MO recording nor for hybrid recording. FIG. 4 shows an example of a thermally-assisted writing scheme according to the invention. The profile 42 of the magnetic field determines the trackwidth 44, while the optical spot 41 in the form of a line determines the bit-transitions and thereby the bitlengths 45 in the track direction. Bit areas 43 having alternatively up and down magnetisation directions are written on the medium by moving the medium under the intersection of areas 41 and 42 and by modulating the magnetic field according to the data. The intersection is approximately the recording location. The recording location is the area on the record carrier where the magnetic field and the thermal profile induced by the light spot interact to change the magnetisation of the magnetic medium. The modulation of the magnetic field can be combined with a (fixed frequency) pulsing of the laser (LP-MFM, Laser-Pulsed Magnetic-Field-Modulation) to induce sharper temperature gradients in the medium during the switching of the field. LP-MFM will lead to sharper bit transitions and allows therefore higher storage densities. A line-shaped spot can for instance be generated by guiding the laser light through a planar optical waveguide structure to the disk. This method leads to rectangular bits and is attractive in combination with magnetic readout because the straight bit transitions give rise to well defined signal transitions during MR readout.

For thermally-assisted writing according to the invention with magneto-optical readout, the laser light is preferably focussed on the disk by an optical lens. This leads to a circular or elliptical spot. As shown in FIG. 5, the profile 52 of the magnetic field determines again the trackwidth 54 while the optical spot 51 determines the bit-transitions and thereby the bitlengths 55. Bit areas 53 having alternatively up and down magnetisation directions are written on the medium by moving the medium under the intersection of areas 51 and 52 and by modulating the magnetic field according to the data. The modulation of the magnetic field can be combined with LP-MFM to induce sharper temperature gradients in the medium during the switching of the field. The combination of an elliptical spot 51 and a rectangular magnetic profile 52 leads to bits 53 with curved transitions. During MO readout this forms no problem because a circular or elliptical spot is also suitable for detecting the Kerr rotation changes due to the changes in the direction of magnetisation of the consecutive bits.

In FIGS. 6–9 a hybrid recording configuration is shown for thermally-assisted writing according to the invention in combination with MR read-out. The optical and magnetic parts are incorporated in a slider 67 flying above the magnetic medium side of a disc 69. The disc 69 comprises a substrate 61 of e.g. Al or glass, a buffer and/or seed layer 62 of e.g. NiP and CrMo, a storage layer 63 of e.g. a CoCrPt alloy having an in-plane magnetisation direction and a cover layer 64 of e.g. diamond-like-carbon (DLC). The laser light is guided by a fibre 71 to the slider and focussed by a lens 72 onto a planar optical waveguide 73 via a mirror 74 and a small hole 75. The waveguide has an exit window 73' in a head area 81. The components 71–75 form an optical head for delivering radiation to the medium. The slider has a central axis 89 and is designed for relative movement in the P-direction to the disc 69. The air bearing surface (ABS) structure, i.e. the profile formed by the head area 81, a rail 82 at the same level as the head area, and a recess 83, are optimized for obtaining the required flying height of the slider. The slider also includes a yoke-type magnetic write head 76 including an upper pole 78 and a shared pole 79, and a shielded MR read-out head 77 including an MR element between two shields both arranged in a plane perpendicular to the track direction. The upper pole 78 of the write head 76 has been reduced at the ABS to a relatively thin section 88 of submicron dimensions, using e.g. FIB structuring. Focussed ion beam (FIB) etching is a known technology to structure poles of conventional hard-disc heads. FIG. 9A shows a cross-section of the write-head through the coil layer in the plane indicated by 'I' in FIG. 7. FIG. 9B shows a cross-section through the upper pole 78 in the plane indicated by 'II' in FIG. 7. The windings 99 of the coil are placed in-between the waveguide 73 and the FIB'ed upper write-head pole 78. To increase the efficiency of the write head, magnetic connections 91 are made between the structured upper pole 78 and the shared pole 79 through two holes 91. The connections are arranged on both sides of the waveguide structure 73. The shielded readout head 77 includes an anistropic magneto-resistance (AMR), giant magneto-resistance (GMR) or tunnel magneto-resistance (TMR) sensor 710. The readout width of the sensor can be controlled by e.g. reducing the width of the sensor at the ABS by FIB structuring, although a trackwidth definition by an accurate placement of the contacts on the MR element is likewise feasible.

The light spot and the magnetic field of the configuration shown in FIGS. 6–9 are adjacent or partly overlapping.

Since the thermal profile induced by the light spot in the recording medium lags behind the light spot due to the relative motion between the light spot and the recording medium, the overlap between the thermal profile and the magnetic field may be larger than the overlap between the light spot and the magnetic field. The recording of the bits takes place in the area of overlap of the thermal profile and the magnetic field.

In FIGS. 10–13 a second hybrid recording configuration is shown for thermally-assisted writing according to the present invention in combination with MR readout. This configuration might be preferred when RE-TM media are used that have a perpendicular orientation of the magnetisation. The optical and magnetic parts are incorporated in a slider 107 on the magnetic medium side of a disc 109. The disc 109 comprises a substrate 101 of e.g. glass or polycarbonate, a soft-magnetic layer 102 of e.g. NiFe or CoZrNb, a storage layer 103 of e.g. a TbFeCo alloy having a perpendicular orientation a readout layer 104 optimised for MR readout of e.g. TbDyFeCo and a cover layer 105 of e.g. diamond like carbon (DLC). The laser light is guided by a fibre 111 to the slider and coupled into a planar optical waveguide 113 using an optical coupling structure 114. The waveguide has an exit window 115 in the plane of the ABS. The slider also includes a yoke-type write head 116 and a shielded MR read-out head 117 for signal detection. The write head configuration shown is an example of a head design which is attractive in combination with the thermally-assisted writing scheme according to the invention. Since the field gradient is less important for writing, an extended pole 121 in the track direction P can be used and the return poles 122 can be placed in a direction perpendicular to the track direction. A head having a center pole 121 with a (FIB'ed) ridge 123 near the ABS as shown offers a higher permeability and is less likely to be pinned in a remnant state than the conventional FIB'ed heads having a ridge perpendicular to the pole. An interesting modification of the magnetic write head with a FIB'ed pole is a replacement of the FIB'ed center pole by a soft-magnetic thin-film pole with its film plane along the slider center line 129. In that case the trackwidth will be determined by the thickness of this pole and thereby by the deposition time. Center poles of 10–20 nm thickness are feasible in this way without FIB structuring, allowing a very accurate control of the write width for the submicron range of trackwidths. FIG. 13 shows a cross-section of the write head along the plane 'III' in FIG. 13. The winding 139 is incorporated in the yoke structure as shown and surrounds the waveguide structure 113, 114.

In the case the thermally-assisted writing method according to the invention is combined with magneto-optical (MO) readout, the configuration should allow for the magneto-optical Kerr-effect detection. FIGS. 14 and 15 show a configuration suitable for thermally assisted writing and MO detection. The laser light is focussed by a lens 153 through the substrate 141 onto the medium stack which incorporates a storage layer 146 of e.g. TbFeCo, dielectric layers 143, 145 and 147 of e.g. $Si_3N_4$ or AlN, a domain expansion layer 144 of e.g. GdFeCo, a reflection and heat conducting layer 148 of e.g. Al and a hard coat 149 of e.g. DLC. The composition of the GdFeCo layer should preferably be chosen such that the material has the required soft-magnetic properties during writing and the required domain expansion properties during reading. The slider 142 having an ABS suitable for the required flying height incorporates one or a multiple of yoke-type write heads 151. In case multiple write heads are used this should be combined with a multiple spot focussing optics or an elliptical spot with a sufficient extension to cover all write heads.

FIGS. 16–18 show a configuration for thermally-assisted recording with MO detection where the optical and magnetic parts are incorporated in a slider 161 situated on the medium side of the disc. The disk comprises a substrate 168 of e.g. polycarbonate, a baselayer 162 of e.g. AlCr, a dielectric layer 163 of e.g. $Si_3N_4$, a storage layer 164 of e.g. TbFeCo, a non-magnetic intermediate layer 165 of e.g. AlN, a domain expansion layer 166 of e.g. GdFeCo and a protective coating 167 of e.g. DLC. The slider configuration 161 comprises a laser and detection unit 171, a slider body 175 and a thin film silicon chip 177. An ABS profile 181 is present on the medium-facing side of the slider 161. In the bottom view of FIG. 17 a transparent window 182 is in the silicon chip. The window is the end face of a quartz element 178 filling a hole in the silicon chip. Adjacent the window is a magnetic write head 176, having a narrow center-pole 187, return poles 189 and an electric current conducting winding 173 which runs in between the center and return poles and around the quartz filled hole similar to the head shown in FIG. 13. The laser light is focussed by a lens 179 through the quartz element 178 onto the medium. The advantage of the design shown is that the focussed spot and field can be brought close together. An exact alignment of the optical and magnetic profile in the track direction P is probably not required because the thermal profile on the disk lags somewhat behind the optical spot. The alignment of the magnetic and optical profiles parallel as well as perpendicular to the track direction P can be optimised e.g. by an adjustable mirror in the optical unit 171. Once aligned, the entire slider 161 or the part of the slider which defines the optical and magnetic profiles need follow the tracks on the magnetic recording medium accurately. The actuator mechanism for this is not shown in the figure.

FIG. 19 shows an apparatus 190 for thermally-assisted recording according to the invention. A disc-shaped storage medium 191 is rotated by an actuator 192. A recording head 193 includes a magnetic read and write head and an optical head. In an MO embodiment of the apparatus, the magnetic read head is replaced by a conventional MO detector in the optical head. A receiver 194 is connected to the read head and detects the data in the read signal from the read head. A driver 195 controls the magnetic field of the write head and a driver 196 controls the radiation field of the optical head. A processing unit 197 is connected to the receiver and makes the data read available for further use. The processing unit also accepts data to be written and provides a control unit 198 with information for writing the data. The control unit controls the two drivers 195 and 196 such that the magnetic field and the light spot are pulsed in the correct manner to record the data.

References: [1] H. Katayama, Sawamura, Y. Ogimoto, J. Nakajima, K. Kojima and K. Ohta, Proc. of MORIS'99, J. Magn. Soc. Jpn. 23, Suppl. S1 , 233 (1999). [2] H. Nemoto, H. Saga, H. Sukeda and M. Takahashi, Jpn. J. Appl. Phys. Vol. 38, 1841 (1999).

What is claimed is:

1. A method of recording data in the form of bits in tracks on a magnetic medium, the recorded tracks having a trackwidth and the recorded bits in the track having a bitlength, using thermally assisted recording to record data at an elevated temperature on the medium using a magnetic write head (76) for generating a magnetic field and an optical head for the local heating of the medium by light from the optical head during recording for the temporary reduction of the coercivity of the medium to facilitate recording, characterized in that the said trackwidth is defined by the profile of the magnetic field and the bitlength is defined by the thermal profile induced in the magnetic medium by the laser light.

2. A method according to claim 1, characterized in that the light is pulsed.

3. A method according to claim 1, characterized in that the magnetic field during writing exceeds 30 kA/m.

4. A method according to claim 1, characterized in that reading of the data is performed by detecting the magnetic stray-field variations of the medium using a magneto-resistive sensor.

5. A recording apparatus for recording data in the form of bits along at least one track on a magnetic recording medium, the track having a track direction, the apparatus including a magnetic write head for generating a magnetic field having a profile at a recording location, an optical head for forming a light spot at the recording location for inducing a thermal profile in the medium, and an actuator for moving the recording location relative to the medium in the track direction, characterized in that the profile of the magnetic field defines the width of a recorded bit in a direction perpendicular to the track direction and the thermal profile defines a length of a recorded bit in the track direction.

6. A recording apparatus according to claim 5, characterized in that the magnetic write head and the optical head are arranged on the same side of the magnetic medium.

7. A recording apparatus according to claim 5, characterized in that the magnetic.recording medium is a magnetic disc medium and in that the apparatus includes an integrated flying slider having a medium-facing surface disposed on a first side of the slider, the said slider including at least one magnetic head provided with a first pole defining a width of the track, the first pole facing the medium-facing side of the slider, the slider also having an optical head including an exit window in the medium-facing surface and arranged to project a light beam out of the exit window to form a light spot on the magnetic recording medium, the exit window neighboring the pole in the track direction.

8. A recording apparatus according to claim 7, characterized in that the magnetic head includes at least one return pole, the return pole and the first pole being oriented in a direction perpendicular to the track direction.

9. A recording apparatus according to claim 5, characterized in that it includes a thin film magneto-resistive read head of the shielded type.

10. A recording apparatus according to claim 5, characterized in that the optical head comprise focusing means for focusing a light beam to the light spot on the the magnetic recording medium.

11. A recording apparatus according to claim 5, characterized in that the optical head comprises adjusting means arranged for adjusting the position of the light spot relative to the pole of the magnetic recording head.

12. A recording apparatus according to claim 11, characterized in that the adjusting means comprise a mirror and mirror support means, the mirror being at least temporarily movable relative to the mirror support means for adjusting purposes.

13. A slider for a recording apparatus as defined claim 5.

14. A method according to claim 1, characterized in that reading of the data is performed using the magneto-optical effect of the medium by means of an optical sensor.

15. A method according to claim 2, characterized in that reading of the data is performed using the magneto-optical effect of the medium by means of an optical sensor.

16. The method of claim 1 wherein the thermal profile defines the trackwidth by providing a gradient in the coercivity in the direction of the track during writing.

* * * * *